United States Patent [19]

Hannah

[11] Patent Number: 5,568,192
[45] Date of Patent: Oct. 22, 1996

[54] METHOD AND APPARATUS FOR PROCESSING DIGITAL VIDEO CAMERA SIGNALS

[75] Inventor: Eric C. Hannah, Pebble Beach, Calif.

[73] Assignee: Intel Corporation, Santa Clara, Calif.

[21] Appl. No.: 520,611

[22] Filed: Aug. 30, 1995

[51] Int. Cl.⁶ ................................................. H04N 5/228
[52] U.S. Cl. .......................... 348/222; 348/552; 348/231
[58] Field of Search ................................... 348/222, 231, 348/207, 552, 659, 660, 661; H04N 5/228, 5/76, 7/00

[56] References Cited

U.S. PATENT DOCUMENTS

| | | | |
|---|---|---|---|
| 4,196,450 | 4/1980 | Miller | 348/552 |
| 4,896,215 | 1/1990 | Morcom | 358/210 |
| 5,486,853 | 1/1996 | Baxter | 348/222 |

Primary Examiner—John K. Peng
Assistant Examiner—Sherrie Hsia
Attorney, Agent, or Firm—William H. Murray; N. Stephan Kinsella

[57] ABSTRACT

A system and method for processing video signals. According to a preferred embodiment, a plurality of video signals is captured with a camera in response to an image. The plurality of video signals is converted with the camera to a plurality of raw digital signals. The plurality of raw digital signals is converted into a plurality of usable digital video signals with a computer, and the plurality of raw digital signals is transmitted to the computer with a bus. The computer processes successive pluralities of raw digital signals at a predetermined frame rate. The bus has a communcations bandwidth sufficient to transmit successive pluralities of raw digital signals in accordance with the predetermined frame rate.

45 Claims, 4 Drawing Sheets

5,568,192

1

METHOD AND APPARATUS FOR PROCESSING DIGITAL VIDEO CAMERA SIGNALS

BACKGROUND OF THE INVENTION

1. Field of the Invention

The present invention relates to signal processing and, in particular, to computer-implemented processes and apparatuses for processing video signals received from a digital video caldera.

2. Description of the Related Art

This invention relates to computer processing of video signals received from a video source such as a video camera. In current usage, video cameras produce analog video signals which are sent to a computer via a coaxial ("coax") cable. Often an $I^2C$ interface is provided to control the camera's registers and to supply power, for example, for small video-conferencing cameras. The $I^2C$ interface provides a standard for controlling video components that require, for example, 100 to 400 kilobits per second of instructions.

Referring now to FIG. 1, there is shown a prior an analog video camera system 100. As illustrated camera system 100 comprises an analog video camera 101 and a computer 102, which are interconnected via Coax+$I^2C$ connection 103. The dotted line surrounding connection 103 represents shielding. The coax portion of connection 103 supplies analog video voltage signals to computer 102/ for analog-to-digital conversion and further processing, and the $I^2C$ portion of connection 103 provides for a relatively low rate of digital control signals transmitted from computer 103 to camera 101.

Current analog video cameras usually perform digital signal processing to provide high quality image processing of the video signal. In one current usage, the analog video camera has a digital processing system ("DSP") subsystem to perform sophisticated image processing, as shown in FIG. 2. Referring now to FIG. 2, there are shown in further detail the components of camera 101 of prior art system 100 of FIG. 1. As illustrated, analog camera 101 comprises a lens 110, physically located near a charged-coupled device ("CCD") 111. An image is focused on CCD 111 by lens 110. CCD 111 provides analog voltage signals corresponding to the image, which are convened to digital signals by analog-to-digital converter ("A/D") 112. These digital signals are further processed by DSP 113, and reconverted to analog signals again by D/A 114. These processed analog video signals are then transmitted as "video out," as illustrated, to a video processor such as computer 102. Video camera 101 also comprises timing/voltage controller 115, read-only memory ("ROM") and random-access memory ("RAM") 116, and controller 117, which receives $I^2C$ standard control signals from computer 102. Controller 117 is used, for example to enable automatic gain control, shutter speed automatic light balance, and the like.

Computer 102 typically comprises various hardware modules which convert the analog voltage signal into digital pixels arrayed in main memory, as illustrated in FIG. 3. Referring now to FIG. 3, there are shown in further detail the components of computer 102 of prior art system 100 of FIG. 1. Computer 102 receives the analog video signals produced by video camera 101, as signals "video in" at a convenient terminal at personal computer ("PC") interface 121. These analog video voltage signals are converted to digital signals by A/D 122, decoded, scaled, and subsampled by decode 123. scale 125, and color subsample 126. These subsampled YUV signals may then be stored in main memory 129 via peripheral component interconnect ("PCI") interface 127 and PCI bus 128. As shown in main memory 129, the YUV digital signals, which represent planar pixel data, are typically stored in subsampled format such as the illustrated YUV 4:1:1 tiermat, in which every (4×4) block of pixels of the Y component plane corresponds to a single pixel in the U component plane and a single pixel in the V component plane.

Unfortunately, such a video camera and video processing system which is based in this manner upon analog signals requires a relatively large number of chips, components, and processing steps, which necessitates tradeoffs between cost and video quality. Such prior art systems thus require either relatively large expense, in terms of cost and complexity, for good quality video, or result in much lower quality video if lower cost is a constraint. Further, instead of utilizing DSP 113, a lower cost solution might have a dedicated application-specific integrated circuit ("ASIC"), but this solution is less powerful and less flexible than the use of DSPs. In addition, because the signals are convened from analog to digital and back to analog, and because the signals are transmitted in analog form, this method is prone to error.

There is thus a need for improved methods and apparatuses for processing video camera signals.

SUMMARY

There is provided herein a system and method for processing video signals. According to a preferred embodiment of the invention, a plurality of video signals is captured with a camera in response to an image. The plurality of video signals is converted with the camera to a plurality of raw digital signals. The plurality of raw digital signals is converted into a plurality of usable digital video signals with a computer, and the plurality of raw digital signals is transmitted to the computer with a bus. The computer processes successive pluralities of raw digital signals at a predetermined frame rate. The bus has a communications bandwidth sufficient to transmit successive pluralities of raw digital signals in accordance with the predetermined frame rate.

BRIEF DESCRIPTION OF THE DRAWINGS

These and other features aspects and advantages of the present invention will become more fully apparent from the following description, appended claims, and accompanying drawings in which:

DESCRIPTION OF THE PREFERRED EMBODIMENT

In the present invention, a high speed bit-serial technology to inexpensively provide enough bandwidth to transmit raw CCD digitized video signals from a digital video camera to a computer system with a processor sufficient to process the raw digital data. Look-up table techniques are also used by the processor to quickly perform all the image processing steps required to convert digital CCD signals into YUV color space pixels, which are then suitable for further processing into compressed video bit streams. The disclosed invention thus allows video processing in real uses such as video conferencing, with typical real-world constraints. Digital cameras connected to the processor with a high speed serial bus offer the opportunity to reduce system costs by performing critical image processing tasks in software on the host computer, rather than in hardware on the camera. The disclosed architecture eliminates expensive silicon components both inside the camera and inside the computer, and thus helps to lower the system costs of both video cameras and video processing systems. The present invention thus allows for cost reduction of video conferencing and other video processing systems, and for image quality improvements as more powerful processors are developed.

SYSTEM HARDWARE

If digital communications are used all the way through the video processing system, best embodied by bit-serial cabling between the camera and the computer, then a relatively simple architecture is possible. In this architecture, the CCD voltages are directly digitized, the bits are transported into main memory with inexpensive hardware, and the relatively powerful central processing unit ("CPU") is used to do all the image processing in software. As CPU's become ignore powerful, this approach scales up in quality and flexibility at the lowest possible hardware cost.

Figure 4:
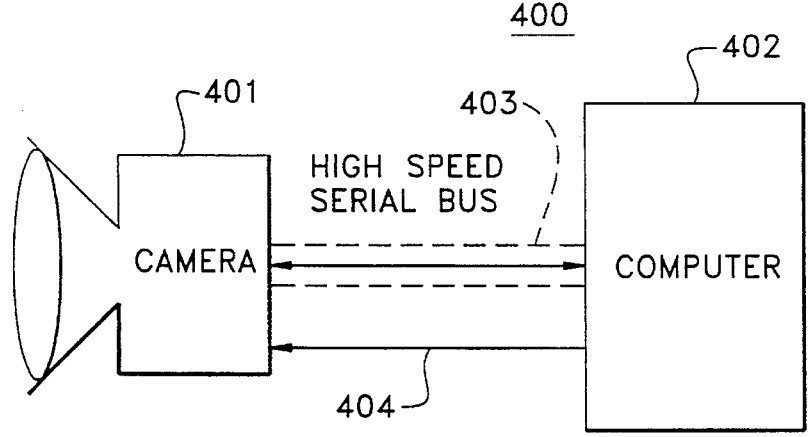
FIG. 4 is a digital video processing system, according to a preferred embodiment of the present invention.

Referring now to FIG. 4, there is shown a digital video processing system 400, in accordance with a preferred embodiment of the present invention. As illustrated,digital video processing system 400 comprises a digital video camera 401 and a computer 402, which are interconnected via a high-speed serial bus 403. High speed serial bus 403 allows for a high rarer of digital data transmission to computer 402, which, in a preferred embodiment, is on the order of at least 400 Mbits/sec. As will be understood, the conununications bandwidth of high speed serial bus 403 must be sufficiently high to transmit, in real time, raw digital signals representing pixels to computer 402, in accordance with the current frame or picture rate. Typical picture rates are 60 fields of interlaced video per second, which corresponds to 30 full frames per second, where each video frame comprises both odd and even line fields. As will be understood, other scan methods are also possible, such as progressive scan video. Low speed serial bus 404 may be any bus suitable for transmitting peripheral device control signals, such as a universal serial bus with a bandwidth of 12 Mbits/sec. As will be appreciated, in alternative preferred embodiments of the present invention, a high-speed parallel bus may be utilized instead of serial bus 403.

Figure 5:
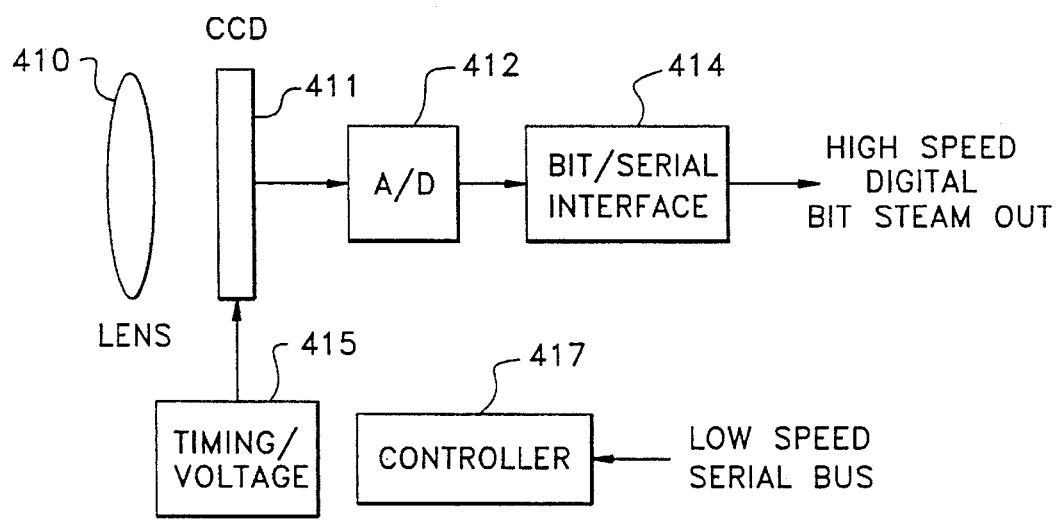
FIG. 5 shows in further detail the components of the digital camera of the digital video processing system of FIG. 4.

A relatively simple digital video cronera 401 is utilized with system 400, so that hardware and functions such as DSP 113 of analog video camera 101 need not be incorporated into digital video camera 401. Referring now to FIG. 5. there are shown in further detail the components of camera 401 of digital video processing system 400 of FIG. 4. As illustrated, digital camera 401 comprises a lens 410, physically located near CCD 411. An image is focused on CCD 411 by lens 410. CCD 411 provides analog voltage signals corresponding to the image, which are converted to digital signals by A/D 412. These raw, unprocessed digital signals are then transmitted as "high speed digital bit stream out" to computer 402 through bit/serial interface 414. Video camera 401 also comprises timing/voltage controller 415 and controller 417, which receives control signals from computer 402 over universal serial bus 404.

Figure 1:
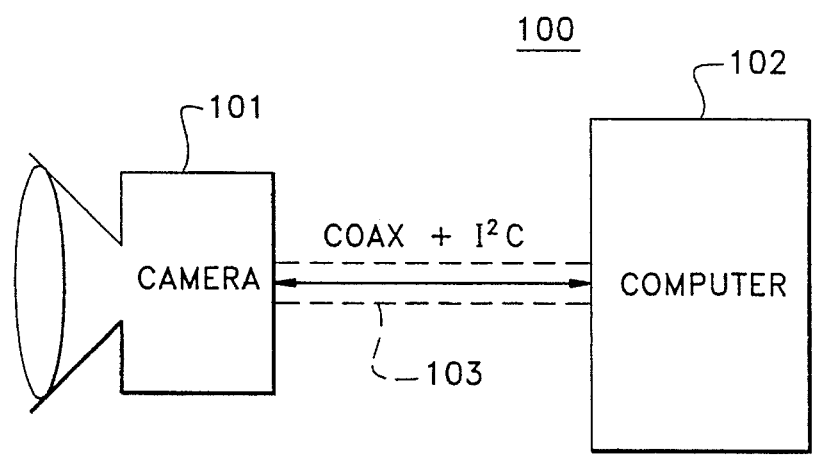
FIG. 1 is a prior art analog video camera system 100.
Figure 2:
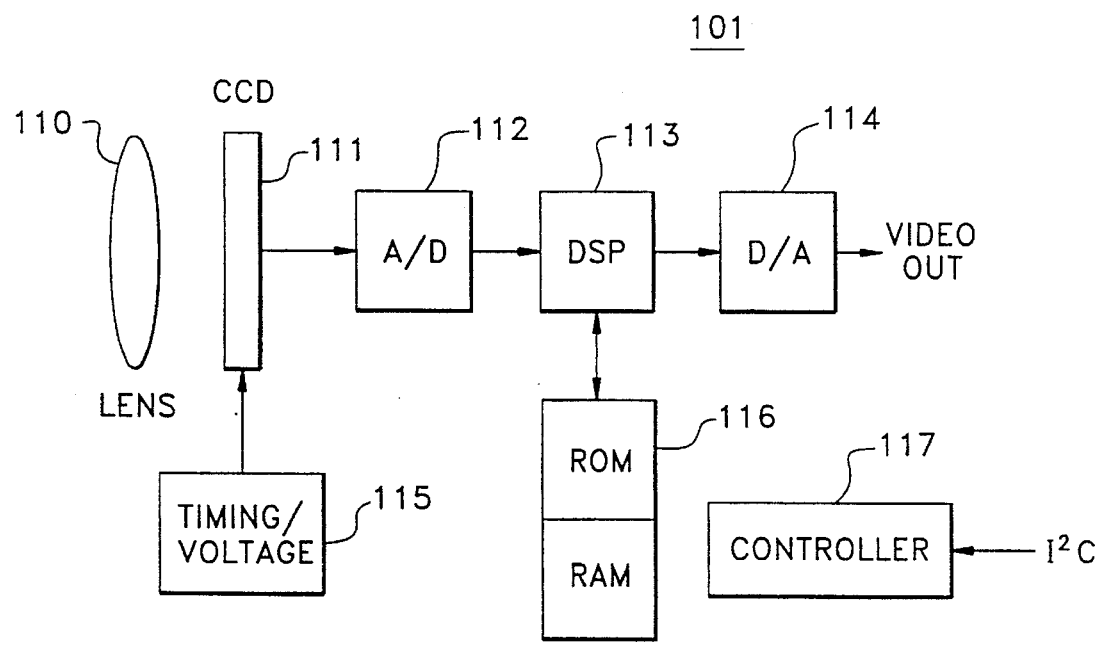
FIG. 2 shows in further detail the components of the camera of the prior art analog video camera system of FIG. 1.
Figure 3:
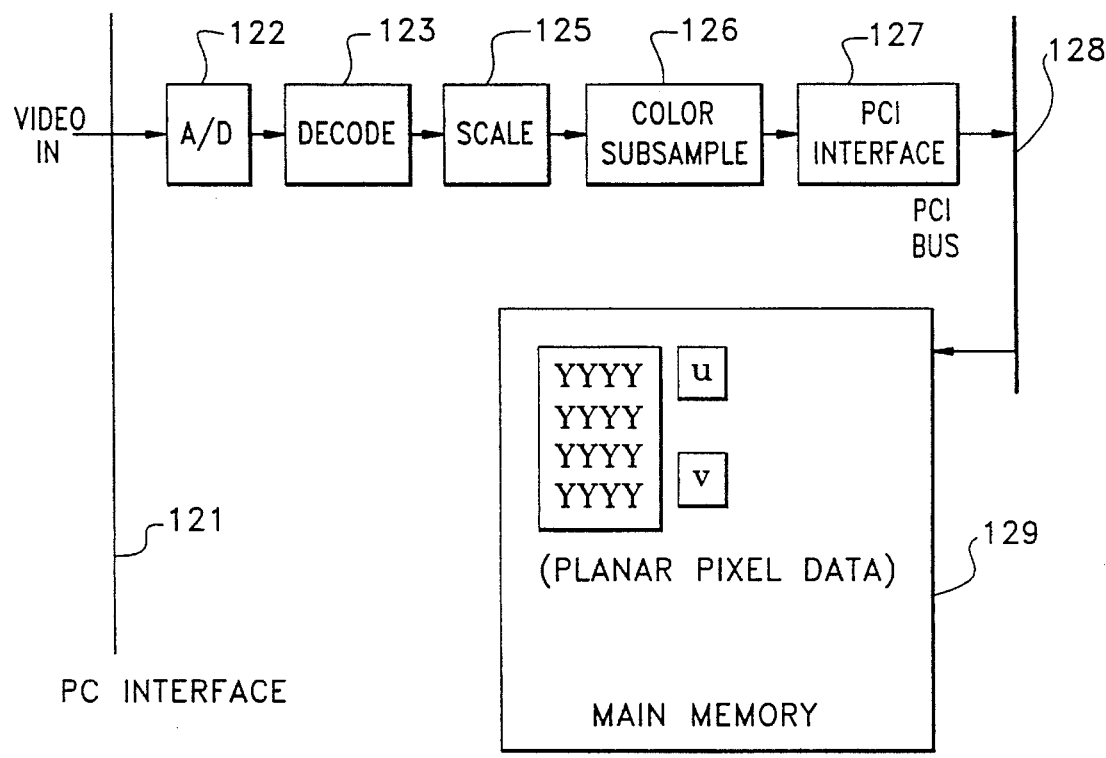
FIG. 3 shows in further detail the components of the computer of the prior art analog video camera system of FIG. 1.
Figure 6:
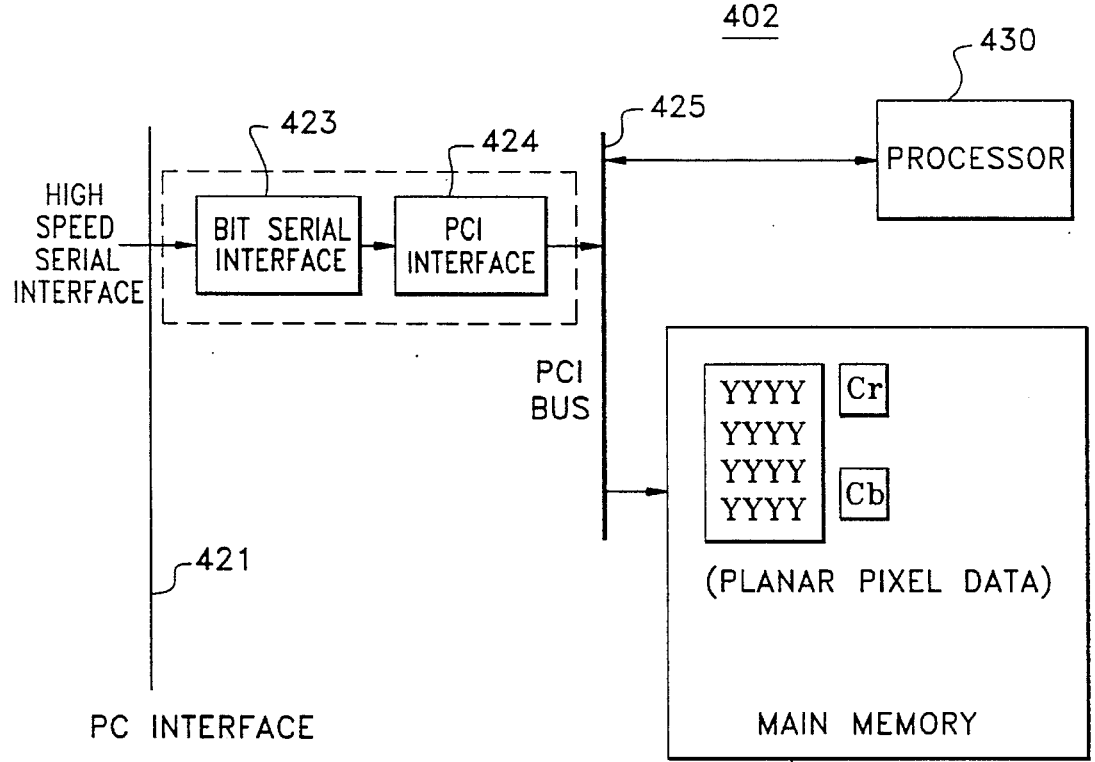
FIG. 6 shows in further detail the components of a computer of the digital video processing system of FIG. 4.

Referring now to FIG. 6, there are shown in further detail the components of computer 402 of digital video processing system 400 of FIG. 4. Computer 402 receives the high speed digital bit stream of raw digital signals from digital video camera 401 through a high speed bit serial interface 423 and PC interface 421. These bits are further transmitted via PCI interface 424 and PCI bus 425 to processor 430 for further processing. After processing, the processed video pixels may be stored as planar pixel data in YUV4:1:1 format in main memory 426, as illustrated. Processor 430 is a sufficiently powerful processor, preferably an Intel® Pentium® processor running at at least 100 MHz. As can be seen, the circuitry inside computer 402 is simplified over that required for prior art computer 101 of FIGS. 1 and 3, in part because the incoming video signals do not need to be converted from analog to digital signals.

The processing of the raw digital video signals by processor 430 that provides usable YUV pixel data is described in further detail hereinbelow.

CCD SIGNALS AND DESIGN

Color Filters

Figure 7:
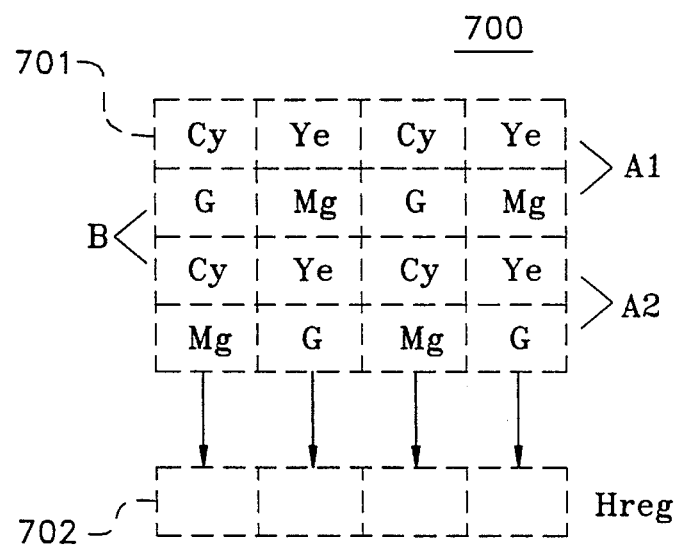
FIG. 7 depicts a CCD color mosaic pattern, in accordance with a preferred embodiment of the present invention.

Referring now to FIG. 7, there is shown CCD color mosaic pattern 700, in accordance with a preferred embodiment of the present invention. As illustrated, patten 700 represents one embodiment of CCD 411 of camera 401, although other CCD designs are used in practice as well. Array 701 is a 4×4 two-dimensional array of photoreceptor sites of a larger array of CCD 411. Each cell of array 701 corresponds to one pixel of resolution. As will be understood by those skilled in the art, each photoreceptor site of array 701 contains a gelatin filter or foil with one of the colors Cyan, Yellow, Green, or Magenta, denoted Cy, Ye, Mg, and G in FIG. 7. Each cell produces an analog voltage corresponding to the intensity of its respective color light waves received. Register ("Hreg") 702 is an analog voltage summing device, which reads out two rows of array 701 at a time, and sums their components.

Color Signals

Video signals are produced with CCD 411 in the following manner. A complementary color filter array ("CFA") sensor such as array 701 produces signals in an interlaced fashion. For the first field, the two A1 rows are combined to produce summed signals in Hreg 702: [G+Cy], [Mg+Ye], [G+Cy], [Mg+Ye]. The luminance signal, Y, is formed by summing the first two Hreg 702 signals: [G+Cy], [Mg+Ye]. The first chroma or color difference signal, Cr, is formed by subtracting these two signals. Next, for the A2 rows we have the following Hreg 702 signals: [Mg+Cy], [G+Ye], [Mg+Cy], [G+Ye]. We again form Y by summing the first two Hreg 702 signals and derive Cb, the second color difference signal, by subtracting these signals from each other. This continues for the rest of the first field. As a result, we have twice as many Y samples as we have of each color difference signal and the Y samples are properly balanced in relation to the scanning lines For the other field, a counter is shifted down one row to produce the B row coupling. This will reverse the spatial locations of the two color difference signals with respect to the first scanned field so an interlaced display will not show an overall spatial separation of color difference signals with respect to the luminance values for the combined two fields on a display, as will be understood by those skilled in the art.

To see that the above operations are correct we first recall that the subtractive colors are defined as follows:

Cy≡G+B

Ye≡G+R

Mg≡B+R.

For the A1 rows the pixel color component math works out as:

$$Y = \{(G+Cy)+(Mg+Ye)\} \times 1/2$$
$$= 1/2\{2B+3G+2R\}.$$
$$Cr = \{(Mg+Ye)-(G+Cy)\}$$
$$= \{2R-G\}.$$

For the A2 rows the math is:

$$Y = \{(G+Ye)+(Mg+Cy)\} \times 1/2$$
$$= 1/2\{2B+3G+2R\}.$$
$$-Cr = \{(G+Ye)-(Mg+Cy)\}$$
$$= -\{2B-G\}.$$

The B rows may be determined similarly, as will be understood. The net result is that CCD 411 produces the signals: {Y, Cr, −Cb}.

As will be understood, these signals {Y, Cr, −Cb} are analog voltage signals, which may then be transmitted to A/D 412 of digital video camera 401 for conversion to digital signals.

COLOR SIGNAL PROCESSING

Given the raw digital signals from camera 401, processor 430 of computer 402 must perform some manipulations on the data to derive good video colors. A linear RGB color space representation must be derived, and processor 430 must perform color balance, gamma correct the RGB signals, and, finally, map into YUV color space.

Linear RGB

First, linear RGB values must be derived from the raw digital video signals. Given the above color difference definitions, the simplest and preferred procedure is to use the following matrix equation:

$$\begin{bmatrix} R \\ G \\ B \end{bmatrix} = \begin{bmatrix} \frac{1}{5} & \frac{2}{5} & \frac{1}{10} \\ \frac{2}{5} & -\frac{1}{5} & \frac{1}{5} \\ \frac{1}{5} & -\frac{1}{10} & -\frac{2}{5} \end{bmatrix} \begin{bmatrix} Y \\ C_r \\ -C_b \end{bmatrix}$$

White Balance

To correct the camera for differing lighting circumstances we must perform white balancing. This is usually done during power-up, but can be controlled by computer commands, or even by downloading the correct color correction factor. White balance is most simply achieved by multiplying the red and blue channels by scaling factors to ensure that white objects have equal R, G, and B values. The following correction equation may be used for this purpose:

$$\begin{bmatrix} R' \\ G' \\ B' \end{bmatrix} = \begin{bmatrix} \alpha & 0 & 0 \\ 0 & 1 & 0 \\ 0 & 0 & \beta \end{bmatrix} \begin{bmatrix} R \\ G \\ B \end{bmatrix}$$

In a preferred embodiment, $\alpha$ and $\beta$ are determined such that white objects have equal red, green, and blue outputs.

Gamma Correction

White balanced RGB signals should be gamma corrected to match typical computer monitor gammas, as will be understood by those skilled in the art. Thus, following transform is used for each of the R, G, B color channels: $I'=I^{\gamma=0.4}$, where I is the input color value, and I' is the output color value. The following boundary conditions are also imposed on the relationship:

$I'_{(I=0)}$ 32 0;

$I'_{(I=255)}$=255.

Figure 8:
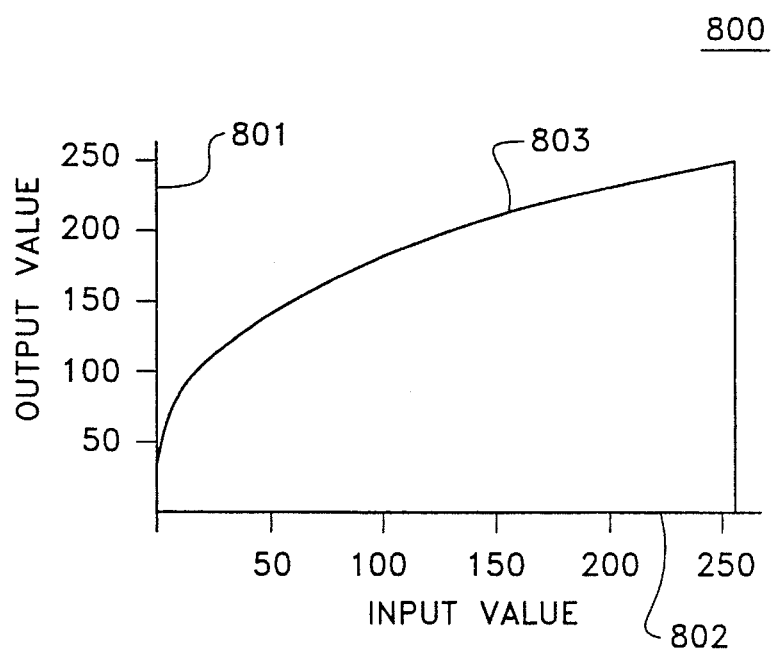
FIG. 8 is a look-up table for plotting output versus input pixel values for gamma correction, according to a preferred embodiment of the present invention.

This mapping is usually best handled by a look-up table ("LUT"), as illustrated in FIG. 8. Referring now to FIG. 8, there is shown look-up table 800 for plotting output versus input pixel values for gamma correction, in accordance with a preferred embodiment of the present invention. In LUT 800, each signal value is a digitized 8-bit value, having a value from 0 to 255. Horizontal axis 802 represents the input value, while the corresponding location on vertical axis 801, in accordance with curve 803, represents the gamma corrected output pixel value. As can be seen, gamma correction creates a strongly non-linear mapping from the camera-produced digital RGB signals to the YUV space, particularly at the lower color values.

YUV Color Space

After gamma correction, the RGB color space signals are converted into YUV color space signals, in accordance with the following equation:

$$\begin{bmatrix} Y \\ U \\ V \end{bmatrix} = \begin{bmatrix} 0.299 & 0.587 & 0.114 \\ -0.147 & -0.289 & 0.436 \\ 0.615 & -0.515 & -0.100 \end{bmatrix} \begin{bmatrix} R \\ G \\ B \end{bmatrix}$$

Spatial Filtering

Along with the pixel component calculations described above, there are a number of spatial filtering calculations that a practical camera system typically performs.

Chroma Cross-Modulation

As can be seen in CFA mosaic diagram 700 of FIG. 7, the various color sensitive photo sites are not in the same physical locations. When bright to dark luminance transitions are focused sharply onto the sensor, anomalous color signals can be produced due to the spacing of the photo sensors. This kind of imaging error is very disturbing as highly textured objects can produce flashing color effects. High quality cameras use a small optical element referred to as a de-focusing plate to ensure that the sharpest image elements are spread out over the full mosaic sampling radius. This typically only slightly increases the cost of the system, but significantly improves perceived video quality.

A side effect of suppressing these color anomalies is a loss in spatial acuity or resolution. The sharpest luminance transitions are averaged over 2 or 3 pixel spaces. Therefore, in a preferred embodiment a two-dimensional ("2D") sharpening filter is run over the raw CCD data array to undo the de-focusing plate's first order effects. A good enhancing filter is the classic "unsharp" filter, shown below as a 3×3 image convolution:

$$\frac{1}{9} \times \begin{bmatrix} -1 & -1 & -1 \\ -1 & w & -1 \\ -1 & -1 & -1 \end{bmatrix}$$

where $w=9A-1$, and $A \geq 1$. As will be understood, increasing the value of A strengthens the amount of high-boost filtering. In a preferred embodiment, this filter is applied only to the Y pixel components. As will be understood, this filter is useful only if the full resolution of the CCD sensor is used by the end application, and scaled-down images do not particularly benefit.

Chroma Sub-Sampling

For video compression algorithms, the chroma signals are typically subsampled since the human eye is less sensitive to spatial changes in chroma signals than with respect to the luminance, or Y, signal. As will be understood, subsampling involves throwing out all but a small sample of the original, as described above with respect to YUV4:1:1 subsampling. As will further be understood, video processing systems typically operate on subsets images, such as (8×8) blocks of pixels, or on macroblocks comprising a number of such blocks. A macroblock typically comprises a (16×16) array of luminance pixels and two associated (8×8) blocks of chroma pixels. The (16×16) luma array is further divided into four (8×8) blocks, so that the macroblock comprises six blocks.

After subsampling to provide YUV4:1:1 pixels, the spatial layout of the resulting pixel components is as follows:

Y Y Y Y
Y Y Y Y
Y Y Y $Y^{uv}$
Y Y Y Y

There are many ways to compute the remaining U and V components. The easiest way to compute the sub-sampled u and v is to select a single set of values from a fixed set of locations inside the larger macroblock. More sophisticated filters are also possible, such as finite impulse response ("FIR"), as will be understood. An alternative method is to choose a different set of locations for each video frame, as determined by a dithering pattern. This performs temporal filmring over the sampling choice and can give a better visual appearance for high frame rate video.

Frame Size Scaling

For current generation video conferencing applications the number of pixels in each frame of video must be reduced to stay within the communication and processing bandwidth constraints. In a preferred embodiment, the frame rate is reduced down from 30 frames per second, which may easily be accomplished by dropping frames.

Scaling down is basically a low pass filter applied first to rows, then to columns. The usual limit in hardware is the amount of on-chip RAM for video line storage. By doing the filtering in software, the entire video field/frame is available so that the main limit becomes processing time available. Thus image quality should continue to scale upwards with better CPUs.

Example Algorithm

The following example is presented to better illustrate the above-described subsampling and scaling. Assume that digital video camera 401 produces two fields of video at the rate of 60 fields per second. In a preferred embodiment arid in the following example, the fields have dimensions of 640 columns×240 rows, having square pixels. As will be understood, these fields are interlaced as odd and even fields to provide 30 frames per second. The target video parameters are 15 frames per second at dimensions of 160 columns×120 rows. The most direct way to spatially filter is to drop either the even or odd fields. Then dropping again every other remaining field yields 15 frames per second at 640×240 resolution. Finally, processor 430 horizontally averages every 4 pixels into one pixel (the average of the 4), then averages every two of the resulting rows to result in dimensions of 160×120. Table 1 below provides a C-language code fragment for performing such horizontal low pass filtering:

TABLE 1

4x Horizontal Low Pass Filtering Code Fragment

```
/* 4x horizontal low pass filtering code fragment */
/* Data bytes organized as YYYY... */
unsigned char *ptr, *out;
/* for each line, ignoring edge checks, etc. */
ptr = start of input line data buffer;
out = start of output line data buffer;
/* Inner Loop 1 */
for(int i=0;i< input linewidth in pixels;i += 4) {
        *out = *ptr++;
        *out += *ptr++;
        *out += *ptr++;
        *out += *ptr++;
        *(out++) = *out>>2;
}
/* 2x vertical low pass filtering code fragment */
/* Data bytes organized as YYYY...
                                    YYYY...
                                    YYYY   */
unsigned char *ptr, *out;
/* for each column, ignoring edge checks, etc. */
ptr = bottom of input column in data buffer;
out = bottom of output column in data buffer;
const stride = bytes per line;
/* Inner Loop 2 */
for(int i=0;i< input column height in pixels;i += 2) {
        *out = *ptr;
        ptr += stride;
        *out += *ptr;
        *out = *out>>1;
        ptr += stride;
        out += stride;
}
```

In terms of processor operations, inner loop 1 requires 4 reads, 1 write, 8 adds, and 1 right shift per output pixel. Inner loop 2 requires 2 reads, 1 write, 4 adds, and 1 right shift per output pixel. Loop overhead is ignored for the present analysis, as it could be minimized by loop unrolling or other well-known techniques. For the current example, it is assumed that chroma subsampling is performed by simple selection, as discussed above. The above code fragments capture the main computations required for spatial filtering.

Look Up Table Techniques

Once a camera's gain and white balance factors have been set it is possible to create a LUT to map the raw digital video signals into YUV pixels. This is for more efficient than directly computing the pixels from the above equations, however more memory is required. A reasonable approach is to generate a $2^{18}$ entry LUT, which requires only about ¾ MB of storage. To index into the table we take the bytes from the raw digitized {Y, Cr, –Cb} signals from digital video camera 401 and compute the following packed 32 bit value, which provides an 18-bit index to the LUT:

| Bit 17 | | | 0 |
|---|---|---|---|
| (Cr + 0x8) >> 2 | (Cb + 0x8) >> 2 | (Y + 0x8) >> 2 | |

As will be understood, the "0x" notation represents a hexadecimal value in the C programming language, e.g. 0×8 represents hexadecimal 8. The ">>2" nomenclature represents taking the 8-bit value and left shifting by two positions, i.e. dividing by four. Thus, this 18-bit index is packed by shifting the three 8-bit bytes 2 positions each to the left, thereby reducing 24 bits to 18.

Next, an array of bytes is defined to hold the YUV outputs, as shown in Table 2 below:

TABLE 2

Array of Bytes for YUV Outputs

```
typedef struct {
        unsigned char Y;
        unsigned char u;
        unsigned char v;
} Yuv;
Yuv LUT[262144];
```

Using this approach the conversion process is simulated to evaluate the error terms that result. Because rounding is used, the mean errors converge to zero and the root-mean-square ("RMS") errors are around 1 bit. Some occasional higher errors appear, but these are likely to be at the border of unphysical {YCrCb} values (i.e., values that imply negative RGB drive values into the CCD, which is physically impossible). In a preferred embodiment, an 18 bit indexed table is assumed to be adequate for video compression. Given the above steps (deriving a linear RGB color space representation from the {YCrCb} signals, color balancing the linear RGB signals to provide color-balanced RGB signals, gamma correcting these RGB signals, and mapping the RGB signals into YUV color space), those skilled in the art will appreciate that a LUT may be created sufficient to simulate some or all of these calculations.

To determine the computational burden, it is assumed that there are 16 Y components for every single Cr and Cb component (YUV4:1:1 color space). Table 3 below illustrates a LUT code fragment, to be used to determine the computational burden associated with utilizing a LUT:

TABLE 3

LUT Code Fragment

```
/* LUT code fragment */
unsigned char *Yptr, *Crptr, *Cbptr;
```

TABLE 3-continued

LUT Code Fragment

```
unsigned int index;
/* for each Y component pixel */
Yptr = start of Y (of YCrCb) data buffer;
Crptr = Cr data pointer;
Cbptr = Cb data pointer;
out = start of output Y (of Yuv) data buffer;
/* first calculate chroma parts of the index */
unsigned int chromaPart = ( (*Crptr+0x8)>>2 )<<12 +
                        (
(*Cbptr+0x8)>>2)<<6;
for(all Y components in the macro block)
        index = chromaPart + (*Yptr++ + 0x8)>>2;
        *out++ = LUT[index];
}
```

As will be appreciated, this inner loop requires 3 reads, 1 write, 4 adds, and 1 right shift per Y value.

Re-Ordering Processing

In the present invention, software running on the host processor or on a specialized video processor in the host computer performs tasks previously performed by hardware either in the camera itself or in the computer. This approach has the advantage that algorithm designers may re-order the sequence of processing steps and then eliminate steps that will have no net output. For example, assume digital video camera 401, utilizing CCD 411, produces raw frames at 640×480 pixels, but a video conferencing application running on processor 430 can only handle 160×120 dimensioned pixel frames. With the present invention, the normal processing stack can be re-ordered by, first, scaling down the YCrCb raw data in main memory 426. Next, a LUT is used to get the YUV Y signals from the smaller frame of scaled raw data. Finally, the YCrCb terms are selected that will just be sufficient to get the very sparse U and V terms in the video macroblock and compute U and V with LUT's. Consequently, following the foregoing method the correct YUV planar data may be computed and stored in main memory, but with a greatly reduced processing bandwidth. The extend of the amount of reduced machine cycles is discussed below.

Machine Cycle Estimates

The following Table 4 shows performance estimates of an Intel Pentium processor-based video processing system. The following assumes 100% use of dual execution units at 100 MHZ clock rate.

TABLE 4

| Intel ® Pentium ® Performance Estimates | |
|---|---|
| Operation | Cycles |
| Shift | 1 |
| Or | 1 |
| Add | 1 |
| Mult | 11 |
| Read | 1 |
| Write | 1 |
| And | 1 |
| Cmp & Branch | 3 |

The following Table 5 summarizes the required operations per pixel for digital camera signal processing in accordance with the present invention:

TABLE 5

Summary of Operations Per Pixel

| Algorithm | fps | rows | cols | R's/pel | W's/pel | Adds/pel | Shifts/Pel | ALU Cycles/sec |
|---|---|---|---|---|---|---|---|---|
| Hor Filt. | 15 | 240 | 160 | 4 | 1 | 8 | 1 | 8,064,000 |
| Vert Filt. | 15 | 120 | 160 | 2 | 1 | 4 | 1 | 2,304,000 |
| LUT | 15 | 120 | 160 | 3 | 1 | 4 | 1 | 2,592,000 |
| | | | | | | | Total: | 12,960,000 |

As will be understood, the "fps" column refers to frames per second; "pel" refers to a pixel, "cols" to columns, and "ALU" to arithmetic logic unit. The R's/pel and W's/pel columns refer to reads and writes per pixel, respectively.

Thus, as can be seen, in accordance with the present invention a substantial cost reduction in video cameras is possible through the use of a high speed serial bus. This form of digital interconnect will permit 400 Mbits/sec of data transfer, which is sufficient to send the raw, digitized CCD signals from camera 401 directly to computer 402. Software running on an Intel Pentium processor can do the work needed to convert digital CCD signals into high quality video signals suitable for video conferencing and other video processing applications. Assuming optimum use of dual execution pipelining, for typical video conference resolution and frame rates it is predicted that the digital camera image processing described above will take 6.5 million processor cycles, or less than 7% of the bandwidth of a 100 MHZ Intel Pentium-based video processor. Single-Instruction Multiple-Data ("SIMD") instructions will likely allow more parallelism in this set of calculations.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A system for processing video signals, comprising:
   (a) camera means capturing a plurality of video signals in response to an image and for converting the plurality of video signals to a plurality of raw digital signals;
   (b) computer means for converting the plurality of raw digital signals into a plurality of usable digital video signals; and
   (c) bus means for transmitting the plurality of raw digital signals to the computer means; wherein:
      the computer means processes successive pluralities of raw digital signals at a predetermined frame rate; and
      the bus means has a communications bandwidth sufficient to transmit the successive pluralities of raw digital signals in accordance with the predetermined frame rate.

2. The system of claim 1, wherein the camera means comprises:
   (a)(1) charged-coupled device (CCD) means for capturing the plurality of video signals in response to the image; and
   (a)(2) analog-to-digital means for converting the plurality of video signals to the plurality of raw digital signals.

3. The system of claim 1, wherein the bus means is a high-speed serial bus.

4. The system of claim 1, wherein the bus means is a parallel bus.

5. The system of claim 1, wherein the plurality of raw digital signals are in {Y, Cr, −Cb} format.

6. The system of claim 1, wherein the plurality of usable digital video signals are in YUV format.

7. The system of claim 6, wherein the plurality of raw digital signals are in {Y, Cr, −Cb} format.

8. The system of claim 7, wherein the computer means comprises look-up table means for converting the plurality of raw digital signals into the plurality of usable digital video signals, wherein {Y, Cr, −Cb} input bytes of the plurality of raw digital signals provide an index to the look-up table means and the look-up table means provides, in response thereto, YUV output bytes of the plurality of usable digital video signals.

9. The system of claim 8, wherein the look-up table means performs the equivalent of the following functions:
   (1) convening the {YCrCb} input bytes of the plurality of raw digital signals to a linear RGB color space representation to provide linear RGB signals;
   (2) color balancing the linear RGB signals to provide color-balanced RGB signals;
   (3) gamma correcting the color-balanced RGB signals to provide gamma-corrected RGB signals; and
   (4) mapping the gamma-corrected RGB signals into YUV color space to provide the YUV output bytes of the plurality of usable digital video signals.

10. The system of claim 8, wherein the look-up table means performs the equivalent of the following functions:
   (1) converting the {YCrCb} input bytes of the plurality of raw digital signals to a linear RGB color space representation to provide linear RGB signals, in accordance with the following equation:

$$\begin{bmatrix} R \\ G \\ B \end{bmatrix} = \begin{bmatrix} \frac{1}{5} & \frac{2}{5} & \frac{1}{10} \\ \frac{2}{5} & -\frac{1}{5} & \frac{1}{5} \\ \frac{1}{5} & -\frac{1}{10} & -\frac{2}{5} \end{bmatrix} \begin{bmatrix} Y \\ C_r \\ -C_b \end{bmatrix};$$

(2) color balancing the linear RGB signals to provide color-balanced RGB signals in accordance with the following equation:

$$\begin{bmatrix} R' \\ G' \\ B' \end{bmatrix} = \begin{bmatrix} \alpha & 0 & 0 \\ 0 & 1 & 0 \\ 0 & 0 & \beta \end{bmatrix} \begin{bmatrix} R \\ G \\ B \end{bmatrix};$$

wherein $\alpha$ and $\beta$ are determined such that white objects have equal red, green, and blue outputs;

(3) gamma correcting the color-balanced RGB signals to provide gamma-corrected RGB signals to match desired computer monitor gammas, for each of R, G, B color channels, in accordance with the transform equation $I'=I^{-0.4}$, wherein:
   I is an input R, G, or B color value;

I' is an output color value;
I'$_{(I=0)}$=0; and
I'$_{(I=255)}$=255; and (4) mapping the gamma-corrected RGB signals into YUV color space to provide the YUV output bytes of the plurality of usable digital video signals, in accordance with the following equation:

$$\begin{bmatrix} Y \\ U \\ V \end{bmatrix} = \begin{bmatrix} 0.299 & 0.587 & 0.114 \\ -0.147 & -0.289 & 0.436 \\ 0.615 & -0.515 & -0.100 \end{bmatrix} \begin{bmatrix} R \\ G \\ B \end{bmatrix}.$$

11. The system of claim 7, wherein the computer means comprises processor means for converting the plurality of raw digital signals into the plurality of usable digital video signals.

12. The system of claim 11, wherein the processor means comprises:

(1) means for convening the {YCrCb} input bytes of the plurality of raw digital signals to a linear RGB color space representation to provide linear RGB signals:

(2) means for color balancing the linear RGB signals to provide color-balanced RGB signals;

(3) means for gamma correcting the color-balanced RGB signals to provide gamma-corrected RGB signals; and (4) means for mapping the gamma-corrected RGB signals into YUV color space to provide the YUV output bytes of the plurality of usable digital video signals.

13. The system of claim 11, wherein the processor means comprises:

(1) means for converting the {YCrCb} input bytes of the plurality of raw digital signals to a linear RGB color space representation to provide linear RGB signals, in accordance with the following equation:

$$\begin{bmatrix} R \\ G \\ B \end{bmatrix} = \begin{bmatrix} \frac{1}{5} & \frac{2}{5} & \frac{1}{10} \\ \frac{2}{5} & -\frac{1}{5} & \frac{1}{5} \\ \frac{1}{5} & -\frac{1}{10} & -\frac{2}{5} \end{bmatrix} \begin{bmatrix} Y \\ C_r \\ -C_b \end{bmatrix};$$

(2) means for color balancing the linear RGB signals to provide color-balanced RGB signals in accordance with the following equation:

$$\begin{bmatrix} R' \\ G' \\ B' \end{bmatrix} = \begin{bmatrix} \alpha & 0 & 0 \\ 0 & 1 & 0 \\ 0 & 0 & \beta \end{bmatrix} \begin{bmatrix} R \\ G \\ B \end{bmatrix};$$

wherein $\alpha$ and $\beta$ are determined such that white objects have equal red, green, and blue outputs;

(3) means for gamma correcting the color-balanced RGB signals to provide gamma-corrected RGB signals to match desired computer monitor gammas, for each of R, G, B color channels, in accordance with the transform equation I'=I$^{\gamma=0.4}$, wherein:

I is an input R, G, or B color value;
I' is an output color value;
I'$_{(I=0)}$=; and
I'$_{(I=255)}$=255; and (4) means for mapping the gamma-corrected RGB signals into YUV color space to provide the YUV output bytes of the plurality of usable digital video signals, in accordance with the following equation:

$$\begin{bmatrix} Y \\ U \\ V \end{bmatrix} = \begin{bmatrix} 0.299 & 0.587 & 0.114 \\ -0.147 & -0.289 & 0.436 \\ 0.615 & -0.515 & -0.100 \end{bmatrix} \begin{bmatrix} R \\ G \\ B \end{bmatrix}.$$

14. The system of claim 1, wherein the computer means comprises look-up table means for converting the plurality of raw digital signals into the plurality of usable digital video signals.

15. The system of claim 1, wherein the computer means comprises processor means for converting the plurality of raw digital signals into the plurality of usable digital video signals.

16. A method for processing video signals, comprising the steps of:

(a) capturing a plurality of video signals with a camera means in response to an image and converting with the camera means the plurality of video signals to a plurality of raw digital signals;

(b) converting the plurality of raw digital signals into a plurality of usable digital video signals with a computer means; and (c) transmitting the plurality of raw digital signals to the computer means with a bus means; wherein:
the computer means processes successive pluralities of raw digital signals at a predetermined frame rate; and
the bus means has a communications bandwidth sufficient to transmit the successive pluralities of raw digital signals in accordance with the predetermined frame rate.

17. The method of claim 16, wherein the camera means comprises:

(a)(1) charged-coupled device (CCD) means for capturing the plurality of video signals in response to the image; and (a)(2) analog-to-digital means for converting the plurality of video signals to the plurality of raw digital signals.

18. The method of claim 16, wherein the bus means is a high-speed serial bus.

19. The method of claim 16, wherein the bus means is a parallel bus.

20. The method of claim 16, wherein the plurality of raw digital signals are in {Y, Cr, −Cb} format.

21. The method of claim 16, wherein the plurality of usable digital video signals are in YUV format.

22. The method of claim 21, wherein the plurality of raw digital signals are in {Y, Cr, −Cb} format.

23. The method of claim 22, wherein the computer means comprises look-up table means for converting the plurality of raw digital signals into the plurality of usable digital video signals, wherein {Y, Cr, −Cb} input bytes of the plurality of raw digital signals provide an index to the look-up table means and the look-up table means provides, in response thereto, YUV output bytes of the plurality of usable digital video signals.

24. The method of claim 23, wherein the look-up table means performs an equivalent net result of the following steps:

(1) converting the {YCrCb} input bytes of the plurality of raw digital signals to a linear RGB color space representation to provide linear RGB signals;

(2) color balancing the linear RGB signals to provide color-balanced RGB signals;

(3) gamma correcting the color-balanced RGB signals to provide gamma-corrected RGB signals; and (4) mapping the gamma-corrected RGB signals into YUV color space to provide the YUV output bytes of the plurality of usable digital video signals.

25. The method of claim 23, wherein the look-up table means performs the equivalent of the follwings steps:

(1) convening the {YCrCb} input bytes of the plurality of raw digital signals to a linear RGB color space representation to provide linear RGB signals, in accordance with the following equation:

$$\begin{bmatrix} R \\ G \\ B \end{bmatrix} = \begin{bmatrix} \frac{1}{5} & \frac{2}{5} & \frac{1}{10} \\ \frac{2}{5} & -\frac{1}{5} & \frac{1}{5} \\ \frac{1}{5} & -\frac{1}{10} & -\frac{2}{5} \end{bmatrix} \begin{bmatrix} Y \\ C_r \\ -C_b \end{bmatrix};$$

(2) color balancing the linear RGB signals to provide color-balanced RGB signals in accordance with the following equation:

$$\begin{bmatrix} R' \\ G' \\ B' \end{bmatrix} = \begin{bmatrix} \alpha & 0 & 0 \\ 0 & 1 & 0 \\ 0 & 0 & \beta \end{bmatrix} \begin{bmatrix} R \\ G \\ B \end{bmatrix};$$

wherein $\alpha$ and $\beta$ are determined such that white objects have equal red, green, and blue outputs;

(3) gamma correcting the color-balanced RGB signals to provide gamma-corrected RGB signals to match desired computer monitor gammas, for each of R, G, B color channels, in accordance with the transform equation $I'=I'^{-0.4}$, wherein:

I is an input R, G, or B color value;
I' is an output color value;
$I'_{(I=0)}=0$; and
$I'_{(I=255)}=255$; and (4) mapping the gamma-corrected RGB signals into YUV color space to provide the YUV output bytes of the plurality of usable digital video signals, in accordance with the following equation:

$$\begin{bmatrix} Y \\ U \\ V \end{bmatrix} = \begin{bmatrix} 0.299 & 0.587 & 0.114 \\ -0.147 & -0.289 & 0.436 \\ 0.615 & -0.515 & -0.100 \end{bmatrix} \begin{bmatrix} R \\ G \\ B \end{bmatrix}.$$

26. The method of claim 22, wherein the computer means comprises processor means for converting the plurality of raw digital signals into the plurality of usable digital video signals.

27. The method of claim 26, wherein step (b) comprises the steps of:

(1) converting the {YCrCb} input bytes of the plurality of raw digital signals to a linear RGB color space representation to provide linear RGB signals;

(2) color balancing the linear RGB signals to provide color-balanced RGB signals;

(3) gamma correcting the color-balanced RGB signals to provide gamma-corrected RGB signals; and (4) mapping the gamma-corrected RGB signals into YUV color space to provide the YUV output bytes of the plurality of usable digital video signals.

28. The method of claim 26, wherein step (b) comprises the steps of:

(1) converting the {YCrCb} input bytes of the plurality of raw digital signals to a linear RGB color space representation to provide linear RGB signals, in accordance with the following equation:

$$\begin{bmatrix} R \\ G \\ B \end{bmatrix} = \begin{bmatrix} \frac{1}{5} & \frac{2}{5} & \frac{1}{10} \\ \frac{2}{5} & -\frac{1}{5} & \frac{1}{5} \\ \frac{1}{5} & -\frac{1}{10} & -\frac{2}{5} \end{bmatrix} \begin{bmatrix} Y \\ C_r \\ -C_b \end{bmatrix};$$

(2) color balancing the linear RGB signals to provide color-balanced RGB signals in accordance with the following equation:

$$\begin{bmatrix} R' \\ G' \\ B' \end{bmatrix} = \begin{bmatrix} \alpha & 0 & 0 \\ 0 & 1 & 0 \\ 0 & 0 & \beta \end{bmatrix} \begin{bmatrix} R \\ G \\ B \end{bmatrix};$$

wherein $\alpha$ and $\beta$ are determined such that white objects have equal red, green, and blue outputs;

(3) gamma correcting the color-balanced RGB signals to provide gamma-corrected RGB signals to match desired computer monitor gammas, for each of R, G, B color channels, in accordance with the transform equation $I'=I'^{-0.4}$, wherein:

I is an input R, G, or B color value;
I' is an output color value;
$I'_{(I=0)}=0$; and
$I'_{(I=255)}=255$; and (4) mapping the gamma-corrected RGB signals into YUV color space to provide the YUV output bytes of the plurality of usable digital video signals, in accordance with the following equation:

$$\begin{bmatrix} Y \\ U \\ V \end{bmatrix} = \begin{bmatrix} 0.299 & 0.587 & 0.114 \\ -0.147 & -0.289 & 0.436 \\ 0.615 & -0.515 & -0.100 \end{bmatrix} \begin{bmatrix} R \\ G \\ B \end{bmatrix}.$$

29. The method of claim 16, wherein the computer means comprises look-up table means for convening the plurality of raw digital signals into the plurality of usable digital video signals.

30. The method of claim 16, wherein the computer means comprises processor means for converting the plurality of raw digital signals into the plurality of usable digital video signals.

31. A system for processing video signals, comprising:

(a) a camera;

(b) a computer; and (c) a bus; wherein:

the camera captures a plurality of video signals in response to an image and converts the plurality of video signals to a plurality of raw digital signals;

the computer converts the plurality of raw digital signals into a plurality of usable digital video signals;

the bus transmits the plurality of raw digital signals to the computer;

the computer processes successive pluralities of raw digital signals at a predetermined frame rate; and the bus has a communications bandwidth sufficient to transmit the successive pluralities of raw digital signals in accordance with the predetermined frame rate.

32. The system of claim 31, wherein the camera comprises:

(a)(1) charged-coupled device (CCD); and (a)(2) an analog-to-digital converter; wherein:
the CCD captures the plurality of video signals in response to the image; and
the analog-to-digital converter converts the plurality of video signals to the plurality of raw digital signals.

33. The system of claim 31, wherein the bus is a high-speed serial bus.

34. The system of claim 31, wherein the bus is a parallel bus.

35. The system of claim 31, wherein the plurality of raw digital signals are in {Y, Cr, –Cb} format.

36. The system of claim 31, wherein the plurality of usable digital video signals are in YUV format.

37. The system of claim 36, wherein the plurality of raw digital signals are in {Y, Cr, –Cb} format.

38. The system of claim 37, wherein the computer comprises a look-up table that converts the plurality of raw digital signals into the plurality of usable digital video signals, wherein {Y, Cr, –Cb} input bytes of the plurality of raw digital signals provide an index to the look-up table and the look-up table provides, in response thereto, YUV output bytes of the plurality of usable digital video signals.

39. The system of claim 38, wherein the look-up table performs the equivalent of the following functions:

(1) converting the {YCrCb} input bytes of the plurality of raw digital signals to a linear RGB color space representation to provide linear RGB signals;

(2) color balancing the linear RGB signals to provide color-balanced RGB signals;

(3) gamma correcting the color-balanced RGB signals to provide gamma-corrected RGB signals; and (4) mapping the gamma-corrected RGB signals into YUV color space to provide the YUV output bytes of the plurality of usable digital video signals.

40. The system of claim 38, wherein the look-up table performs the equivalent of the following functions:

(1) converting the {YCrCb} input bytes of the plurality of raw digital signals to a linear RGB color space representation to provide linear RGB signals, in accordance with the following equation:

$$\begin{bmatrix} R \\ G \\ B \end{bmatrix} = \begin{bmatrix} \frac{1}{5} & \frac{2}{5} & \frac{1}{10} \\ \frac{2}{5} & -\frac{1}{5} & \frac{1}{5} \\ \frac{1}{5} & -\frac{1}{10} & -\frac{2}{5} \end{bmatrix} \begin{bmatrix} Y \\ C_r \\ -C_b \end{bmatrix};$$

(2) color balancing the linear RGB signals to provide color-balanced RGB signals in accordance with the following equation:

$$\begin{bmatrix} R' \\ G' \\ B' \end{bmatrix} = \begin{bmatrix} \alpha & 0 & 0 \\ 0 & 1 & 0 \\ 0 & 0 & \beta \end{bmatrix} \begin{bmatrix} R \\ G \\ B \end{bmatrix};$$

wherein $\alpha$ and $\beta$ are determined such that white objects have equal red, green, and blue outputs;

(3) gamma correcting the color-balanced RGB signals to provide gamma-corrected RGB signals to match desired computer monitor gammas, for each of R, G, B color channels, in accordance with the transform equation $I' = I'^{0.4}$, wherein:
I is an input R, G, or B color value;
I' is an output color value;
$I'_{(I=0)} = 0$; and
$I'_{(I=255)} = 255$; and (4) mapping the gamma-corrected RGB signals into YUV color space to provide the YUV output bytes of the plurality of usable digital video signals, in accordance with the following equation:

$$\begin{bmatrix} Y \\ U \\ V \end{bmatrix} = \begin{bmatrix} 0.299 & 0.587 & 0.114 \\ -0.147 & -0.289 & 0.436 \\ 0.615 & -0.515 & -0.100 \end{bmatrix} \begin{bmatrix} R \\ G \\ B \end{bmatrix}.$$

41. The system of claim 37, wherein the computer comprises a processor that converts the plurality of raw digital signals into the plurality of usable digital video signals.

42. The system of claim 41, wherein the processor:

(1) converts the {YCrCb} input bytes of the plurality of raw digital signals to a linear RGB color space representation to provide linear RGB signals;

(2) color balances the linear RGB signals to provide color-balanced RGB signals;

(3) gamma corrects the color-balanced RGB signals to provide gamma-corrected RGB signals; and (4) maps the gamma-corrected RGB signals into YUV color space to provide the YUV output bytes of the plurality of usable digital video signals.

43. The system of claim 41, wherein the processor:

(1) converts the {YCrCb} input bytes of the plurality of raw digital signals to a linear RGB color space representation to provide linear RGB signals, in accordance with the following equation:

$$\begin{bmatrix} R \\ G \\ B \end{bmatrix} = \begin{bmatrix} \frac{1}{5} & \frac{2}{5} & \frac{1}{10} \\ \frac{2}{5} & -\frac{1}{5} & \frac{1}{5} \\ \frac{1}{5} & -\frac{1}{10} & -\frac{2}{5} \end{bmatrix} \begin{bmatrix} Y \\ C_r \\ -C_b \end{bmatrix};$$

(2) color balances the linear RGB signals to provide color-balanced RGB signals in accordance with the following equation:

$$\begin{bmatrix} R' \\ G' \\ B' \end{bmatrix} = \begin{bmatrix} \alpha & 0 & 0 \\ 0 & 1 & 0 \\ 0 & 0 & \beta \end{bmatrix} \begin{bmatrix} R \\ G \\ B \end{bmatrix};$$

wherein $\alpha$ and $\beta$ are determined such that white objects have equal red, green, and blue outputs;

(3) gamma corrects the color-balanced RGB signals to provide gamma-corrected RGB signals to match desired computer monitor gammas, for each of R, G, B color channels, in accordance with the transform equation $I' = I'^{0.4}$, wherein:
I is an input R, G, or B color value;
I' is an output color value:
$I'_{(I=0)} = 0$; and
$I'_{(I=255)} = 255$; and (4) maps the gamma-corrected RGB signals into YUV color space to provide the YUV output bytes of the plurality of usable digital video signals, in accordance with the following equation:

$$\begin{bmatrix} Y \\ U \\ V \end{bmatrix} = \begin{bmatrix} 0.299 & 0.587 & 0.114 \\ -0.147 & -0.289 & 0.436 \\ 0.615 & -0.515 & -0.100 \end{bmatrix} \begin{bmatrix} R \\ G \\ B \end{bmatrix}.$$

44. The system of claim 31, wherein the computer comprises a look-up table, wherein the look-up table converts the plurality of raw digital signals into the plurality of usable digital video signals.

45. The system of claim 31, wherein the computer comprises a processor that converts the plurality of raw digital signals into the plurality of usable digital video signals.

* * * * *

UNITED STATES PATENT AND TRADEMARK OFFICE
CERTIFICATE OF CORRECTION

PATENT NO. : 5,568,192
DATED : October 22, 1996
INVENTOR(S) : Eric C. Hannah

It is certified that error appears in the above-indentified patent and that said Letters Patent is hereby corrected as shown below:

In the claims:

Column 12, line 27:
Delete "convening", and insert therefor --converting--.

Column 13, line 21:
Delete "convening", and insert therefor --converting--.

Column 15, line 6:
Delete "convening", and insert therefor --converting--.

Column 16, line 43:
Delete "convening", and insert therefor --converting--.

Signed and Sealed this

Fourth Day of March, 1997

Attest:

BRUCE LEHMAN

*Attesting Officer*  Commissioner of Patents and Trademarks